United States Patent [19]
Yanagawa et al.

[11] Patent Number: 5,214,725
[45] Date of Patent: May 25, 1993

[54] OPTICAL COUPLER/SPLITTER WITH A FILTER

[75] Inventors: Hisaharu Yanagawa, Tokyo; Takeo Shimizu, Fujisawa; Shiro Nakamura; Isao Ohyama, both of Ichihara, all of Japan

[73] Assignee: The Furukawa Electric Co., Ltd., Tokyo, Japan

[21] Appl. No.: 891,424

[22] Filed: May 29, 1992

[30] Foreign Application Priority Data

Jun. 3, 1991 [JP] Japan .................................. 3-131165

[51] Int. Cl.$^5$ ............................ G02B 6/00; G02B 6/10
[52] U.S. Cl. .................................. 385/45; 385/47; 385/129; 385/131; 385/31; 359/885; 359/890
[58] Field of Search ........................ 385/45, 24, 46, 47, 385/31, 129, 130, 131, 132; 359/115, 117, 121, 124, 127, 130, 885, 890

[56] References Cited

U.S. PATENT DOCUMENTS

| | | | |
|---|---|---|---|
| 4,708,423 | 11/1987 | Erman et al. | 385/47 |
| 4,790,615 | 12/1988 | Seki et al. | 385/14 |
| 4,842,357 | 6/1989 | Doneen | 385/47 |
| 4,860,294 | 8/1989 | Winzer et al. | 385/45 |
| 5,048,909 | 9/1991 | Henry et al. | 385/45 X |
| 5,093,876 | 3/1992 | Henry et al. | 385/45 X |
| 5,111,519 | 5/1992 | Mathis | 385/24 |

*Primary Examiner*—Brian Healy
*Attorney, Agent, or Firm*—Frishauf, Holtz, Goodman & Woodward

[57] ABSTRACT

An optical coupler/splitter having an optical waveguide on the side of light incidence, two optical waveguides on the branched side, branched from the former optical waveguide and each having straight and curved sections, and a dielectric multi-layer film filter provided in a manner crossing the latter waveguides and common to them. The filter is so formed as to intersect with a straight section of one waveguide and with a curved section of the other, so that respective crossing angles between the filter and the branched optical waveguides differ from each other, thereby providing different reflection or transmission characteristics with respect to the branched optical waveguides. An optical signal having a variable wavelength and issued from a measuring apparatus based on the backscattering method is distinguished by the common filter of the coupler/splitter, making it possible to perform measurement of the losses of the branched optical waveguides independently without being affected by interference light. There is no need to provide a plurality of filters having different characteristics, and thus the coupler/splitter has a simplified structure and excellent productivity.

3 Claims, 2 Drawing Sheets

OPTICAL COUPLER/SPLITTER WITH A FILTER

BACKGROUND OF THE INVENTION

The present invention relates to an optical coupler/splitter for use in an optical fiber communications system or an optical sensor system, and more particularly, to an optical coupler/splitter with a filter, which makes it possible to locate a fault taking place in a system, especially in an optical fiber beyond the optical coupler/splitter and which features a simple structure, permitting high productivity.

It is known that an OTDR (optical time domain reflectometer) based on the backscattering method is used to locate a fault of deteriorated mechanical characteristic or transmission characteristic of an optical fiber in an optical fiber communications system or the like. In a typical OTDR, an optical output pulse from a semiconductor laser is guided into an optical fiber to be measured, and the back scattering light, which is scattered and bounced back from the optical fiber is detected, thus measuring a loss of the optical fiber.

However, the optical fiber communications system incorporates an optical coupler/splitter for branching optical power from a single input to a plurality of outputs or for combining a plurality of inputs into a single output. This occasionally causes difficulties in locating a fault point in the system, especially in an optical fiber beyond the optical coupler/splitter, by using a light signal from the OTDR.

For instance, it is difficult to locate a fault point in a system shown in FIG. 1, which system includes a 1-input, 4-output optical coupler/splitter 1 comprising an input port 1a and four output ports 1b, 1c, 1d, and 1e which are branched from the above-mentioned input port and to which optical fibers 3a, 3b, 3c, and 3d are connected. More specifically, when an attempt is made to locate the fault point in the system of FIG. 1, especially the fault point in the optical fiber 3a, 3b, 3c or 3d beyond the optical coupler/splitter 1 by using an OTDR 4a, which issues light of a fixed wavelength, from the side of an optical fiber 2 connected to the input port 1a, it is possible to determine a distance between the fault point in the optical fiber 3a, 3b, 3c or 3d beyond the coupler/splitter 1 and the OTDR 4a, but it is impossible to specify which optical fiber has developed the fault.

In addition, the distance between the OTDR 4a and the fault point can be determined provided that the coupler/splitter has a small number of branched optical ports, e.g., a combination of 1 input and 2 outputs or of 1 input and 4 outputs. In a coupler/splitter with more branched optical ports as in a coupler/splitter which has, for example, 1 input and 16 outputs, it becomes difficult to determine the distance between the OTDR and the fault point because interference light adversely affects the S/N ratio.

To resolve the difficulty described above, a system shown in FIG. 2 has been proposed. This system differs from the system shown in FIG. 1 in that it has an OTDR 4b which uses a light source of a variable wavelength in place of the OTDR 4a which issues light of the fixed wavelength illustrated in FIG. 1 and in the respective output ports of its coupler/splitter 1 are equipped with filters 5a, 5b, 5c and 5d which respond to different transmitting wavelengths or reflecting wavelengths and which generally have different transmissivities. According to the system, it is possible to determine the distance between the OTDR 4b and the fault point and also specify an output port which incurs the fault.

However, in the system illustrated in FIG. 2, it is necessary to provide all branched output ports of the coupler/splitter with different types of filters, requiring an extremely complicated manufacturing process with resultant poor productivity.

OBJECTS AND SUMMARY OF THE INVENTION

An object of the present invention is to provide an optical coupler/splitter with a filter which enables locating a fault taking place in the optical fiber beyond the optical coupler/splitter.

Another object of the present invention is to provide an optical coupler/splitter with a filter which features a simple structure and therefore permits high-productivity manufacture.

According to the present invention, an optical coupler/splitter with a filter is provided, which comprises at least one optical port, a group of optical ports consisting of a plurality of optical ports which are branched from or connected to the at least one optical port, and at least one dielectric multi-layer film filter which is common to said group of optical ports. The at least one dielectric multi-layer film filter is provided in a manner crossing the group of optical ports, and respective crossing angles formed between the filter and the optical ports are all different from each other.

Preferably, the at least one dielectric multi-layer film filter common to the group of optical ports is comprised of only one dielectric multi-layer film filter. Also, each of the optical ports includes a curved section thereof connected to the at least one optical port and a straight section thereof connected to the curved section; the at least one dielectric multilayer film filter extends in a manner obliquely crossing the group of optical ports, and intersects with each of the optical ports at a prescribed point of the curved section or the straight section of said each optical port.

The present invention provides the following advantage; the dielectric multi-layer film filter is installed so that said filter intersects with the respective optical ports constituting the group of optical ports at different angles in order to permit wavelength selectivity, making it possible to measure a loss at each optical port separately and independently by sending out optical signals of different wavelengths to the respective optical ports of the group of optical ports by using, for instance, an OTDR having a variable-wavelength light source. Thus the loss of each optical port can be measured without being affected by interference light even if an optical coupler/splitter has many branched optical ports, thereby making it also possible to locate a fault point in the optical coupler/splitter. Furthermore, according to the present invention, distinguishing a plurality of wavelengths supplied to the optical coupler/splitter requires only a single dielectric multi-layer film filter, permitting a simpler configuration than that of the conventional system wherein different filters are provided on the individual optical ports. This leads to easier manufacture of the optical coupler/splitters.

DETAILED DESCRIPTION OF THE INVENTION

Figure 1:
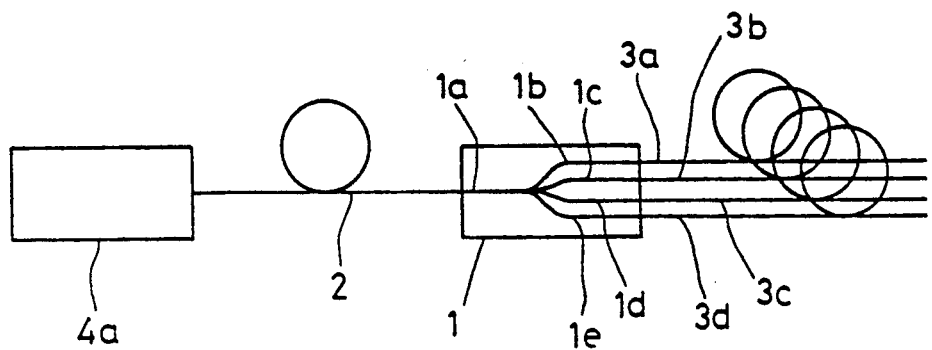
FIG. 1 is a schematic diagram illustrating an optical fiber communications system which incorporates a conventional optical coupler/splitter.

The optical coupler/splitter according to the embodiment of the present invention is described with reference to FIG. 3.

This optical coupler/splitter is a 1-input, 2-output tree splitter comprising a silica-based optical waveguide (optical port) 5 and two silica-based optical waveguides 6 and 7 which are branched from the optical waveguide 5 and which constitute a group of optical ports. These optical waveguides are produced by depositing silica particle in layers on a silicon substrate by the flame hydrolysis deposition method, and glassifying them, then subjecting them to dry etching. The sectional area and the specific refraction difference $\Delta$ of the optical waveguides 5, 6 and 7 are fixed to 8 $\mu m\square$ and 0.3%, respectively, to match the standard single-mode fiber.

The optical waveguide 6 is comprised of a straight section 6a on the emitting side and a curved section 6b which is connected to the end of the branched side of said straight section, and the optical waveguide 7 is comprised of a similar straight section 7a and a similar curved section 7b. The straight sections 6a and 7a of both optical waveguides 6 and 7 are positioned in parallel to each other.

Further, a single straight dielectric multi-layer film filter 8, which is common to both optical waveguides 6 and 7, is installed in a manner obliquely crossing the two waveguides 6 and 7. One end 8a of the dielectric multi-layer film filter 8 intersects with the optical waveguide 6 at a prescribed point of the straight section 6a of said waveguide, while the other end 8b of the filter 8 intersects with the optical waveguide 7 at a prescribed point of the curved section 7b of said waveguide. Thus, a crossing angle $\theta 1$ formed between the dielectric multi-layer film filter 8 and the optical waveguide 6 is set, for example, at 77°, and a crossing angle $\theta 2$ formed between the filter 8 and the optical waveguide 7b is set, for example, at 74°. In other words, the angle of incidence of light into the filter 8 is set, for instance, at 13° on the side of the optical waveguide 6, and at 16°, for instance, on the side of the optical waveguide 7.

Figure 4:
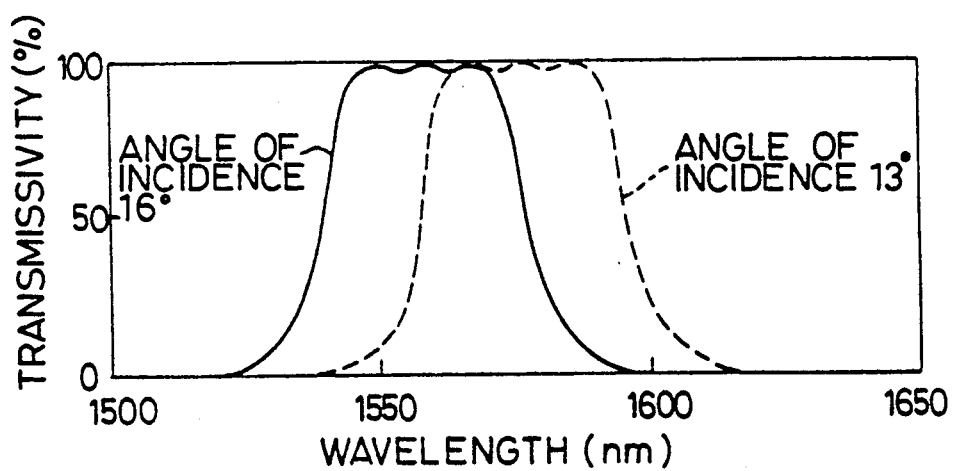
FIG. 4 is a graph which shows the transmissivity-wavelength characteristic of a dielectric multi-layer film filter used for the optical coupler/splitter shown in FIG. 3.

The dielectric multi-layer film filter 8 is of a band passing type comprised of $TiO_2$ and $SiO_2$ alternately tiered on a 20 $\mu m$-thick glass substrate. It exhibits the transmissivity-wavelength characteristic with respect to the angles of incidence of 13° and 16° as shown in FIG. 4.

To install the dielectric multi-layer film filter 8 as described above with reference to FIG. 3, slits are provided obliquely in the silica-based optical waveguides 6 and 7 at locations where the filter is to be installed, the dielectric multi-layer film filter 8 is inserted in the slits, and the filter 8 and the optical waveguides 6 and 7 are bonded using an optical adhesive agent or the like.

Figure 2:
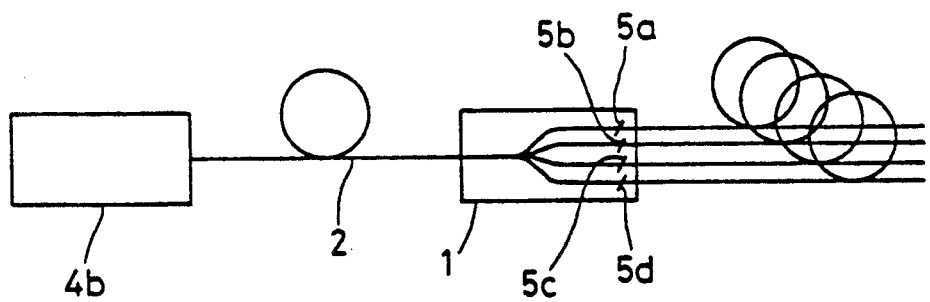
FIG. 2 is a schematic diagram illustrating an optical fiber communications system which incorporates an optical coupler/splitter that is different from the one in FIG. 1.
Figure 3:
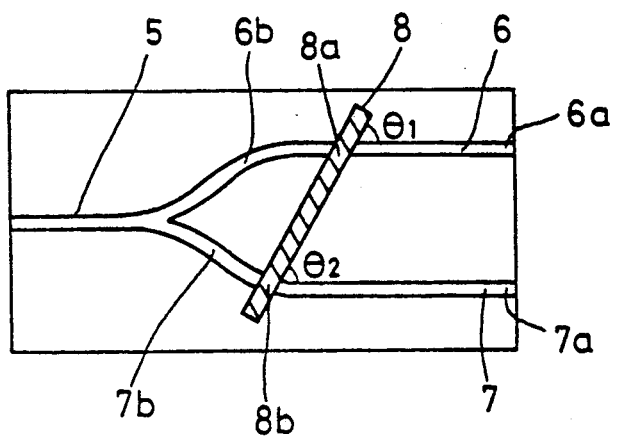
FIG. 3 is a schematic plan view of an optical coupler/splitter in accordance with an embodiment of the present invention.

With the coupler/splitter shown in FIG. 3 built in the system of FIG. 2, the losses of the respective optical fibers (corresponding to the optical fibers 3a and 3b in FIG. 1) connected to the optical waveguide 6 and the optical waveguide 7 were measured by an OTDR equipped with a 1.55 $\mu m$-band, variable-wavelength laser diode (variable wavelength range: 1.53 to 1.59 $\mu m$), using lights of 1.55 $\mu m$ and 1.58 $\mu m$ wavelengths. This made it possible to evaluate the losses of the respective optical fiber independently.

The reason, as described above, is that the crossing angle $\theta 1$ (=77°) formed between the optical waveguide 6 and the dielectric multi-layer film filter 8 is different from the crossing angle $\theta 2$ (=74°) formed between the optical waveguide 7 and the filter 8, thus the angle of incidence (=13°) of the light entering the filter 8 through the optical waveguide 6 is different from the angle of incidence (=16°) of the light entering the filter 8 through the optical waveguide 7. As shown in FIG. 4, in the dielectric multi-layer film filter 8, as the angle of incidence of entering light increases, the light, which passes through the filter or reflects from the filter, shifts toward a shorter wavelength. In other words, the reflecting or transmitting characteristic of the filter 8 with respect to the optical waveguides 6 and 7 differs between the two waveguides. Consequently, by installing the dielectric multi-layer film filter 8, which is common to the optical waveguides 6 and 7, so that the angles of incidence of light entering the filter via the respective optical waveguides differ, it is possible to determine a fault independently in the respective optical waveguides 6 and 7 just like the case where the optical waveguides 6 and 7 are equipped with filters having different reflecting or transmitting characteristics.

The present invention is not limited to the above-mentioned embodiment, but may be implemented in diverse other variations.

Specifically, in the embodiment, a case was described wherein the present invention is applied to the 1-input, 2-output tree splitter. However, the present invention is applicable also to, for instance, a $1 \times N$ tree splitter wherein the branched side has optical ports comprising an N number of silica-based waveguides. In this case, the N number of branched optical ports are formed so that the crossing angles between the N number of branched optical ports and a single dielectric multi-layer film filter, for instance, which is common to those optical ports, differ from each other. In this manner, a fault at each optical port can be separately and independently determined.

Further, the present invention is not limited to the above-mentioned waveguide type coupler/splitter, but is also applicable to, for example, a 2-input, 2-output fused taper fiber type coupler/splitter, in which case the loss of each optical port can be also determined independently.

Furthermore, two or more dielectric multi-layer film filters that are common to the group of optical ports may be used as necessary. Also, in the embodiment described above, the straight filter, which obliquely extends, intersects with one optical port on the branched side at the straight section of said optical port and with the other optical port on the branched side at the curved section of said optical port, so that the crossing angles between the two optical ports and the filter differ from each other. Alternatively, for example, the filter which extends crossing the group of optical ports may be formed in a curved shape to obtain the same effect.

What is claimed is:

1. An optical coupler/splitter with a filter, comprising:
   at least one optical port;
   a group of optical ports comprising a plurality of optical ports which are branched from or connected to said at least one optical port; and
   at least one dielectric multi-layer film filter common to said group of optical ports, said at least one dielectric multi-layer film filter being arranged in a manner to intersect and cross said group of optical ports, respective crossing angles formed between respective ones of said plurality of optical ports and said at least one dielectric multi-layer film filter being all different from each other.

2. The optical coupler/splitter according to claim 1, wherein said at least one dielectric multi-layer film filter common to said group of optical parts is comprised only of a single dielectric multi-layer film filter.

3. The optical coupler/splitter according to claim 1, wherein each of said plurality of optical ports of said group of optical ports includes a curved section thereof and a straight section thereof connected to said curved section, and said at least one dielectric multi-layer film filter extends in a manner obliquely crossing said group of optical ports, and intersects with each of said plurality of optical ports at a prescribed location located on one of said curved section and said straight section of said each optical port.

* * * * *